US006704183B2

(12) United States Patent
Stafford

(10) Patent No.: US 6,704,183 B2
(45) Date of Patent: Mar. 9, 2004

(54) FAULT DETECTION IN A LED BIAS CIRCUIT

(75) Inventor: Kenneth R. Stafford, Ft Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 366 days.

(21) Appl. No.: 09/819,409

(22) Filed: Mar. 27, 2001

(65) Prior Publication Data

US 2002/0141125 A1 Oct. 3, 2002

(51) Int. Cl.[7] .............................. H02H 3/08; H01L 31/00
(52) U.S. Cl. .................. 361/93.7; 361/93.7; 250/214 R
(58) Field of Search ................................ 361/93.7, 93.9, 361/91.2, 93.8; 250/201, 214 R, 221

(56) References Cited

U.S. PATENT DOCUMENTS

| | | | | |
|---|---|---|---|---|
| 4,504,776 A | * | 3/1985 | Haville | 323/288 |
| 4,532,472 A | * | 7/1985 | Ishino | 324/122 |
| 4,940,889 A | * | 7/1990 | Ono et al. | 250/214 R |
| 5,966,110 A | * | 10/1999 | Van Zalinge | 345/82 |
| 6,384,804 B1 | * | 5/2002 | Dodabalapur et al. | 345/82 |

* cited by examiner

Primary Examiner—Brian Sircus
Assistant Examiner—Danny Nguyen
(74) Attorney, Agent, or Firm—Pamela Lau Kee

(57) ABSTRACT

A bias circuit for preventing excessive emission from light emitting diodes includes a switch connected to power. A light emitting diode connects to the switch output. Two bias current legs, electrically connected in parallel, interpose the light emitting diode and ground. A fault comparator connects to the bias current legs and a logic OR gate. Four fault comparators can be implemented, each detecting a unique fault condition. The logic OR gate has an output connected to the input of the switch.

13 Claims, 3 Drawing Sheets

FAULT DETECTION IN A LED BIAS CIRCUIT

FIELD OF THE INVENTION

The invention is directed towards the field of light emitting diodes, particularly towards biasing circuits for light emitting diodes.

BACKGROUND

Products containing light emitting diodes (LED) which emit light in the visible or infrared range must conform to eye safety requirements, IEC 60825-1. If the optical flux that can impinge on a user's eye exceeds the standard, the device must be labeled an eye safety hazard, which is undesirable. This requirement applies not only during normal operation of the circuit but when single faults occur in the circuit.

FIG. 1 illustrates a prior art eye safety circuit. This simple circuit uses a fuse. When the bias current exceeds the eye safety requirement, the fuse blows.

FIG. 2 illustrates another prior art eye safety circuit. This circuit is a retriggerable transistor circuit that shunts current away from the LED when the current exceeds a design threshold.

The prior art circuits detect when the LED current is higher than some preset current. However, the circuit in FIG. 1 cannot detect a fault in which the LED cathode is connected to GROUND, and the fuse cannot be readily integrated onto an integrated circuit. The circuit in FIG. 2 can detect a fault where the LED cathode is shorted to Ground, but this circuit would be difficult to implement on a standard CMOS integrated circuit process.

SUMMARY

A bias circuit for light emitting diodes includes a switch connected to power. A light emitting diode connects to the switch output. Two bias current legs, electrically connected in parallel, interpose the light emitting diode and ground. A fault comparator is connected to the bias current legs and a logic OR gate. Four fault comparators can be implemented, each detecting a unique fault condition. The logic OR gate having an output connects to the input of the switch.

A first fault comparator has a negative input connected to the output of the bias current legs node VL, and a positive input receives a voltage signal VL−. This detects a short circuit from node VL to ground.

A second fault comparator has a positive input connected to one of the two bias current legs and a negative input connected to the other of the two bias current legs. This differentially compares the current between the two bias current legs.

To detect additional fault conditions, a bias resistor interposes the two bias current legs and ground. An amplifier has a positive input receiving a voltage reference signal, a negative input connected to the bias resistor, and an output connected to both bias current legs. A third comparator has a negative input receiving a voltage signal VREF+, having a positive input connected to the bias resistor. The third comparator detects when a high voltage on VB occurs. A fourth comparator has a negative input connected to the bias resistor and a positive input receiving a voltage signal VREF−. The fourth comparator detects when a low voltage on VB occurs.

DETAILED DESCRIPTION

Figure 1:
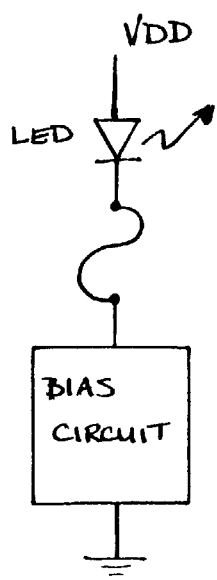
FIG. 1 illustrates a prior art eye safety circuit.
Figure 2:
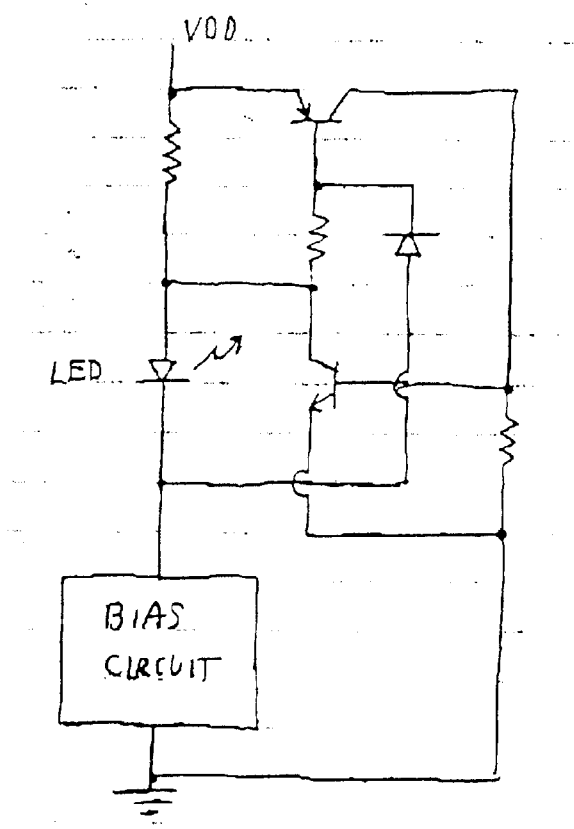
FIG. 2 illustrates another prior art eye safety circuit.
Figure 3:
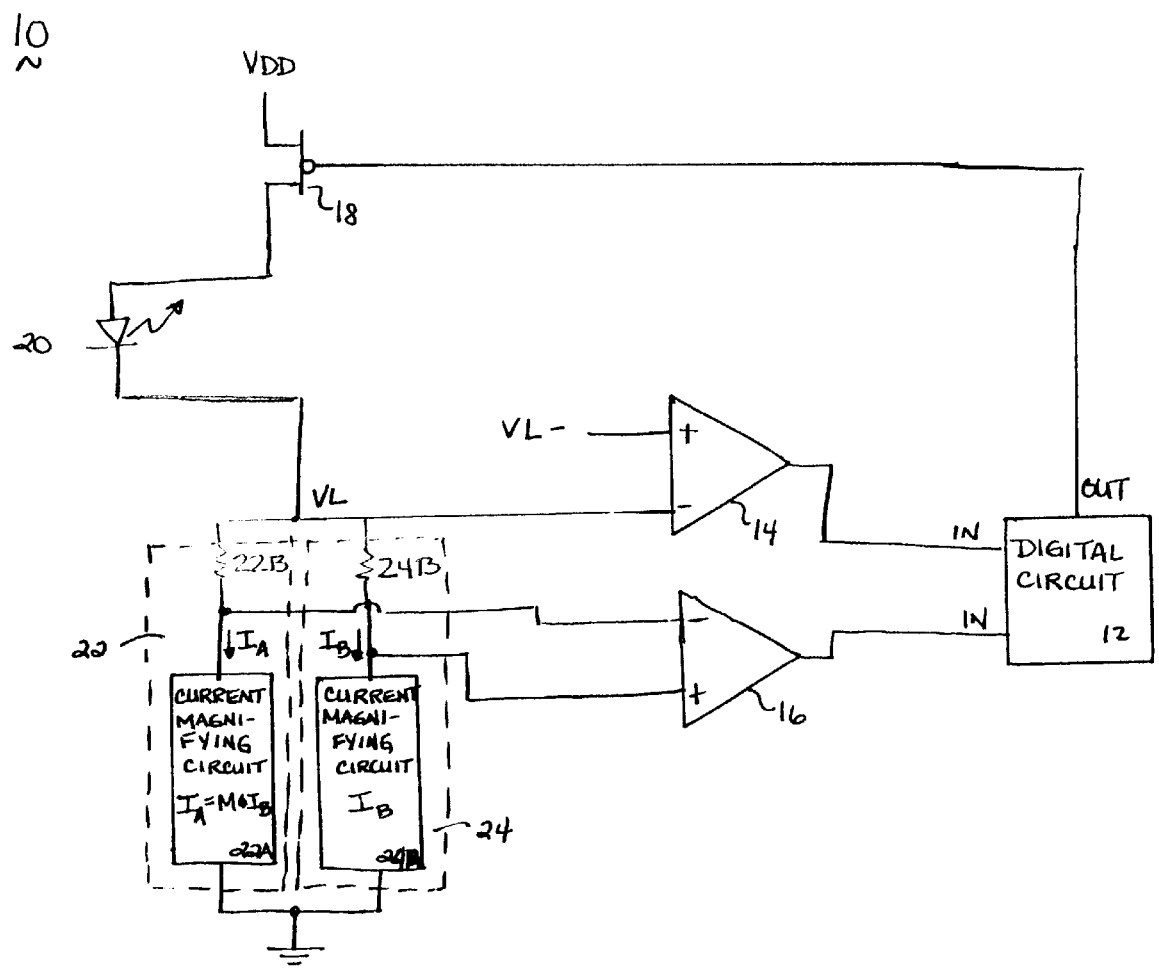
FIG. 3 illustrates an embodiment of the present invention.

FIG. 3 illustrates an embodiment of the present invention 10. A digital circuit 12 receives the output from two comparators 14, 16. Each comparator 14, 16 tests for a different fault. A switch 18, e.g. a field effect transistor, interposes VDD and a light emitting diode (LED) 20. The input of the switch 18 receives the output of the digital circuit 12. Two bias current legs 22, 24, connected in parallel, connect between the LED 20 and Ground potential. Each bias current circuit 22, 24 contains a current sensing resistor 22B, 24B and a current magnifying circuit 22A, 24A connected in series.

The negative input of comparator 14 is connected to node VL (the cathode of the LED 20), while the positive input of 14 is connected to a DC voltage source, VL−. The positive input of comparator 16 is connected to the negative end of current sensing resistor 24B, while the negative input of 16 is connected to the negative end of current sensing resistor 22B.

Under normal conditions, the circuit operates in the following manner. When the voltage at node VL is higher than voltage VL−, the output of comparator 14 is LOW. The bias current legs 22, 24 are designed so that the current in bias leg 22 is much greater than the current in bias leg 24. The current in the LED 20 will be the sum of these two currents, $$I_{LED} = I_A + I_B, \text{ where } I_A \gg I_B \quad \text{Equation 1}$$

The values of current-sensing resistors 22B, 24B are chosen so that the voltage across current sensing resistor 22B (VR1) is slightly smaller than voltage across current sensing resistor 24B (VR2). Since $I_A \gg I_B$, the value of current sensing resistor 24B must be much larger than the value of current sensing resistor 22B to meet this requirement. With VR1<VR2, the output of comparator 16 is LOW. With the output of both comparators LOW, the output of the digital circuit, which has an OR function, will also be low. Therefore, switch 18 will be ON, and current will flow through the LED 20. Note that provisions have to be made in the digital circuit 12 to assure that the circuit biases up in the correct state when power is first applied to the circuit.

The circuit 10 is designed to detect single faults that would cause the current flowing through the LED 20 to increase by a significant amount over the intended value. There are two single fault conditions that this embodiment detects. If the current magnifying circuit 22A fails in such a manner that its output current increases significantly, voltage VR1 will be larger than voltage VR2, the output of comparator 16 will go high, the output of the digital circuit 12 will go high, and the switch 18 will be turned off. If current magnifying circuit 24A fails in such a manner that its output current increases significantly, the additional voltage drop across current sensing resistor 24B will limit the additional current so that the resulting increase in the total LED current is small enough so that the eye safety limit is not exceeded. If voltage at node VL is much lower than expected (lower than VL−) such as could occur if node VL were shorted to ground, the output of comparator 14 will go high, the output of the digital circuit will go high, and the switch will be turned off.

Figure 4:
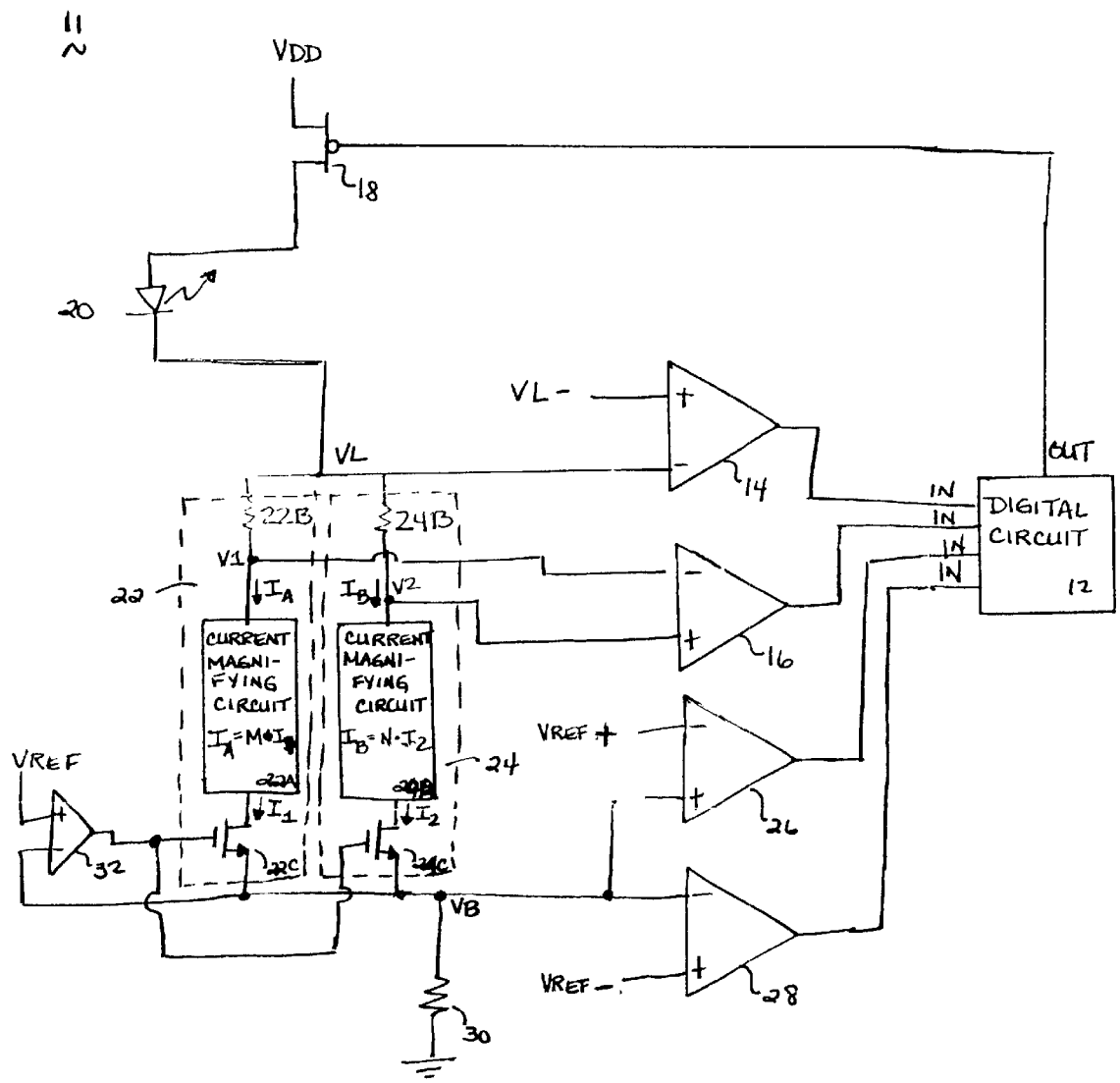
FIG. 4 illustrates an alternate embodiment of the present invention.

FIG. 4 illustrates an alternative embodiment of the present invention 11. A digital circuit receives the output from four comparators 14, 16, 26, 28. Each comparator tests for a different fault condition. A switch 18, e.g. a field effect transistor, interposes VDD and a light emitting diode (LED) 20. The input of the switch 18 receives the output of the digital circuit. Two bias current legs 22, 24, connected in parallel, connect between the LED 20 and a bias resistor 30. The opposing end of bias resistor 30 is connected to ground. The bias current legs 22, 24 are connected to each of the comparators 14, 16, 26, 28. For comparator 14, the negative input is connected to the output of the bias current legs 22, 24 and the positive input receives DC voltage VL−. For comparator 16, the positive and negative inputs are connected differentially to nodes within the bias current legs 22, 24. For comparator 26, the negative input receives a DC voltage VREF+, while the positive input is connected to node VB. For comparator 28, the negative input is connected to the input of the bias current legs 22, 24 and the positive input receives DC voltage source VREF−. The positive input of amplifier 32 receives DC voltage source VREF. The output of amplifier 32 is connected to the bias current legs 22, 24 while the negative input is connected to node VB.

Each bias current leg 22, 24 includes a current-sensing resistor 22B, 24B interposing the LED 20 and a current magnifying circuit 22A, 24A. A transistor 22C, 24C, e.g. a field effect transistor, has a drain connected to the current magnifying circuit, a gate connected to the amplifier output, and a source connected to the bias resistor (RB) 30.

All components were implemented as an integrated circuit except for the LED 20 and the bias resistor 30. The digital circuit 12 has the functional logic corresponding to a four-input OR gate.

During normal operation (no fault), the amplifier 32 and the transistors 22C, 24C form a feedback loop that forces node VB to be at the same voltage as the reference voltage signal VREF. Thus, the combined current through these transistors will be I=VREF/RB, where RB is the value of the bias resistor 30. If the transistors are of the same size, then their currents, $I_1$ and $I_2$, will be the same. Currents $I_1$ and $I_2$ are scaled up by the current magnifying circuits 22A, 24A so that the output currents $I_A$ and $I_B$ are in the ratio of M:N, where M>>N. These bias currents flow through the current-sensing resistors 22B, 24B and the combined current flows through the LED 20 and the switch 18. The current through the LED 20 (and hence its light output) is set by selecting the value of the bias resistor (RB) 30 and the value of VREF. Equation 2 describes the value of the current flowing through the LED 20 for the case where transistors 22C, 24C are the same size:

$$I_{LED}=(VREF/RB)(M+N)/2 \quad \text{Equation 2}$$

The circuit is designed to detect single faults that would cause the current flowing through the LED to increase by a significant amount over the intended value. There are four single fault conditions that this embodiment detects. First, when voltage at node VB is much lower than intended, this can occur when the bias resistor RB 30 is a short circuit to ground. Second, when voltage at node VB is much higher than intended, this can occur when the voltage signal VREF is higher than expected. Third, when the ratio of currents $I_A$ and $I_B$ is much larger than intended, this can occur when the current magnifying circuit 22A malfunctions and has a higher current multiplication factor than intended. Fourth, when voltage VL is much lower than expected, this can occur when node VL is shorted to ground potential.

Each of these faults is detected by one of the comparators. The comparators 14, 16, 26, 28 drive the digital circuit 12. The digital circuit 12 is designed to turn off the switch 18 if a fault is detected, e.g. a comparator indicates a logic HIGH output. Turning off switch 18 turns off the LED current. Fault detection occurs as follows. The positive input of comparator 14 is biased at a voltage VL− that is lower than voltage signal VL such that when a low voltage on VL occurs, the output of comparator 14 goes HIGH. The negative input of comparator 26 is biased at a voltage VREF+ that is higher than VREF such that when a high voltage on node VB occurs, the output of comparator 26 goes HIGH. The positive input of comparator 28 is biased at a voltage VREF− which is slightly lower than the voltage VREF such that a short circuit from node VB to ground will cause the output of comparator 28 to go HIGH. The values of current sensing resistors 22B, 24B are chosen such that for normal operation, the voltage at node V1 is slightly higher than the voltage at node V2. Because current $I_A$ is much larger than $I_B$, the value of current sensing resistor 24B will be much larger than the value of current sensing resistor 22B.

When current magnifying circuit 22A has a fault that causes its output current to be too high, the voltage at node V1 will be lower than the voltage at node V2, and the output of comparator 16 goes HIGH. When current magnifying circuit 24A has a fault that causes its output current to be higher than the desired value, the increase in current will be limited by the relatively high value of current sensing resistor 24B. Hence, the incremental increase in the LED current will be small and the eye safety limit will not be exceeded.

As will be evident to one skilled in the art, the innovation may be implemented as an integrated circuit on a single substrate.

I claim:

1. A bias circuit for light emitting diodes comprising:

a switch, connected to power, having an input;

a light emitting diode connected to the switch;

two bias current legs, electrically connected in parallel, interposing the light emitting diode and ground, each bias current leg including,
  a current-sensing resistor connected to the light emitting diode; and
  a current magnifying circuit, connected to the current-sensing resistor;

a first comparator, having a negative input connected to the input of the bias current legs and a positive input receives a low DC voltage signal;

a second comparator, having a positive input connected to one of the two bias current legs and a negative input connected to the other of the two bias current legs; and a logic OR gate, having an output connected to the input of the switch digital circuit, receiving an output from the first and second comparators.

2. A bias circuit for light emitting diodes comprising:

a switch, connected to power, having an input;

a light emitting diode connected to the switch;

two bias current legs, electrically connected in parallel, interposing the light emitting diode and ground;

a first comparator, having a negative input connected to the input of the bias current legs and a positive input receives a low DC voltage signal;

a second comparator, having a positive input connected to one of the two bias current legs and a negative input connected to the other of the two bias current legs;

a logic OR gate, having an output connected to the input of the switch digital circuit, receiving an output from the first and second comparators;

a bias resistor interposing the two bias current legs and ground;

an amplifier, having a positive input receiving a voltage reference signal, a negative input connected to the bias resistor, and an output connected to the two bias legs; and a third comparator, having a negative input receiving a high voltage signal, having a positive input connected to the bias resistor; the logic OR gate, further receiving the output from the third comparator.

3. A bias circuit for light emitting diodes, as in claim 2, further comprising:

a fourth comparator, having a negative input connected to the bias resistor and a positive input receiving a low voltage signal; and the logic OR gate, further receiving the output from the fourth comparator.

4. A bias circuit for light emitting diodes, as in claim 2, each bias current leg including:

a current-sensing resistor connected to the light emitting diode;

a current magnifying circuit, connected to the current-sensing resistor; and a transistor, providing art output to the current magnifying circuit, an input connected to the amplifier output, and an input connected to the bias resistor.

5. A bias circuit for light emitting diodes, as in claim 4, wherein the transistor is a field effect transistor.

6. A bias circuit for light emitting diodes, as in claim 5, wherein the field effect transistors for the two bias current legs have the same size.

7. A bias circuit for light emitting diodes comprising:

a switch, connected to power, having an input;

a light emitting diode connected to the switch;

two bias current legs electrically connected in parallel, interposing the light emitting diode and ground;

a first comparator, having a negative input connected to the input of the bias current legs and a positive input receives a low DC voltage signal;

a second comparator, having a positive input connected to one of the two bias current legs and a negative input connected to the other of the two bias current legs;

a logic OR gate, having an output connected to the input of the switch digital circuit, receiving an output from the first and second comparators;

a substrate that includes the switch, the two bias current legs, the first and second comparators, and the logic OR gate.

8. A bias circuit for light emitting diodes, as in claim 7, each bias current leg including:

a current-sensing resistor connected to the light emitting diode; and a current magnifying circuit, connected to the current-sensing resistor.

9. A bias circuit for light emitting diodes, as in claim 7, further comprising:

a bias resistor interposing the two bias current legs and ground;

an amplifier, having a positive input receiving a voltage reference signal, a negative input connected to the bias resistor, and an output connected to both bias legs;

a third comparator, having a negative input receiving a high voltage signal, having a positive input connected to the bias resistor;

the logic OR gate, further receiving the output from the third comparator; and wherein the substrate includes the amplifier and the third comparator.

10. A bias circuit for light emitting diodes, as in claim 9, further comprising a fourth comparator, positioned on the substrate, having a negative input connected to the bias resistor and a positive input receiving a low voltage signal.

11. A bias circuit for light emitting diodes, as in claim 9, each bias current leg including:

a current-sensing resistor connected to the light emitting diode;

a current magnifying circuit, connected to the current sensing resistor; and a transistor, providing an output to the current magnifying circuit, an input connected to the amplifier output, and an input connected to the bias resistor.

12. A bias circuit for light emitting diodes, as in claim 11, wherein the transistor is a field effect transistor.

13. A bias circuit for light emitting diodes, as in claim 12, wherein the field effect for the two bias current legs have the same size.

* * * * *